United States Patent
Ronkainen (10) Patent No.: US 7,570,967 B2
(45) Date of Patent: Aug. 4, 2009

(54) METHOD AND SYSTEM OF TRANSMISSION POWER CONTROL

(75) Inventor: Henrik Ronkainen, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 410 days.

(21) Appl. No.: 10/451,425

(22) PCT Filed: Dec. 18, 2001

(86) PCT No.: PCT/SE01/02818

§ 371 (c)(1), (2), (4) Date: Jun. 23, 2003

(87) PCT Pub. No.: WO02/054624

PCT Pub. Date: Jul. 11, 2002

(65) Prior Publication Data

US 2004/0087328 A1 May 6, 2004

(30) Foreign Application Priority Data

Dec. 29, 2000 (SE) .................................. 0004923

(51) Int. Cl.
*H04B 7/00* (2006.01)
*H04Q 7/20* (2006.01)

(52) U.S. Cl. .................. 455/522; 455/69; 455/67.11; 455/517

(58) Field of Classification Search ............ 455/522, 455/69, 507, 67.11, 68, 70, 517, 67.1, 126, 455/127.1, 135, 509, 115.1; 370/335, 342, 370/336, 337

See application file for complete search history.

(56) References Cited

U.S. PATENT DOCUMENTS

| | | | | |
|---|---|---|---|---|
| 5,623,486 A * | 4/1997 | Dohi et al. | ..................... | 455/69 |
| 5,751,763 A * | 5/1998 | Bruckert | ..................... | 455/522 |
| 5,995,496 A * | 11/1999 | Honkasalo et al. | ............ | 455/69 |
| 6,285,886 B1 * | 9/2001 | Kamel et al. | ................. | 455/522 |
| 6,343,218 B1 * | 1/2002 | Kaneda et al. | ................. | 455/522 |
| 6,408,165 B1 * | 6/2002 | Raissinia et al. | ............... | 455/69 |
| 6,493,541 B1 * | 12/2002 | Gunnarsson et al. | .......... | 455/69 |
| 6,512,931 B1 * | 1/2003 | Kim et al. | ................... | 455/522 |
| 6,804,512 B1 * | 10/2004 | Baker et al. | ................. | 456/522 |
| 7,031,740 B2 * | 4/2006 | Lundby et al. | ............... | 455/522 |
| 7,079,827 B2 * | 7/2006 | Richards et al. | ............. | 455/266 |
| 2002/0031105 A1 * | 3/2002 | Zeira et al. | ................... | 370/337 |
| 2007/0213028 A1 * | 9/2007 | Shohara et al. | .......... | 455/343.1 |

FOREIGN PATENT DOCUMENTS

EP 0 955 735 A2 11/1999
WO 00/62443 A1 10/2000

OTHER PUBLICATIONS

International Preliminary Examination Report mailed Nov. 15, 2002 in corresponding PCT application No. PCT/SE01/02818.

* cited by examiner

*Primary Examiner*—John J Lee
(74) *Attorney, Agent, or Firm*—Nixon & Vanderhye, P.C.

(57) ABSTRACT

The present invention relates to cellular mobile radio systems, and more especially it relates to Code Division Multiple Access, CDMA, cellular mobile radio systems, particularly to transmission power control in such systems. A method and apparatus for transmission of TPC commands when a user equipment is beyond or close to a certain cell radius is disclosed.

23 Claims, 6 Drawing Sheets

METHOD AND SYSTEM OF TRANSMISSION POWER CONTROL

This application is the U.S. National phase of international application PCT/SEO1/02818 filed 18 Dec. 2001 which designates the U.S.

TECHNICAL FIELD OF THE INVENTION

The present invention relates to cellular mobile radio systems, and more especially it relates to Code Division Multiple Access, CDMA, cellular mobile radio systems, particularly to transmission power control in such systems.

BACKGROUND AND DESCRIPTION OF RELATED ART

Transmission power control, TPC, transmitting single or multiple TPC bits from a radio base station, RBS, to a mobile station, MS, or vice versa informing the receiving party to increase or decrease the transmission power level, optionally by a specified amount, is previously known.

Transmission power control compensates for signal fading and interference dynamics at a receiver. Closed loop power control according to prior art is described in relation to FIG. 1. In closed loop power control received pilot channel signal to interference ratio, SIR, is measured at the receiving end (RBS for uplink). The level of the SIR equals the SIR or a quantized value thereof. The level of the SIR is compared with a target level. Information on the outcome of the comparison is fed back in the reverse direction in the form of TPC commands. Radio wave propagation and power control processing introduces a delay in the feedback loop. To achieve a feedback loop with minimum (one slot) delay, transmission power response and measurement should be controlled within one slot. The transmitting end adjusts transmission power in response to received TPC commands. The receiving end receives, at a propagation delayed time, a pilot signal transmitted at the adjusted level, closing the power control loop. If the level of the measured SIR is larger than the target level, the receiving end transmits a command towards the transmitting end (MS for uplink) to decrease the power at the transmitting end. If the level of the measured SIR is smaller than the target level the transmitting end is correspondingly instructed to increase the transmission power. Finally, if the level of the measured SIR is equal to the target level the receiving end receives no command, a command of no change of transmission power or interchanging commands of transmission power increase and decrease to keep the transmission power close to constant. The command to increase or decrease transmission power is sent by means of one or more TPC bits. A TPC command determined accordingly and within a predetermined one slot loop delay, irrespective of whether it refers to uplink or downlink power control, is called a regular TPC command in this patent application.

Figure 1:
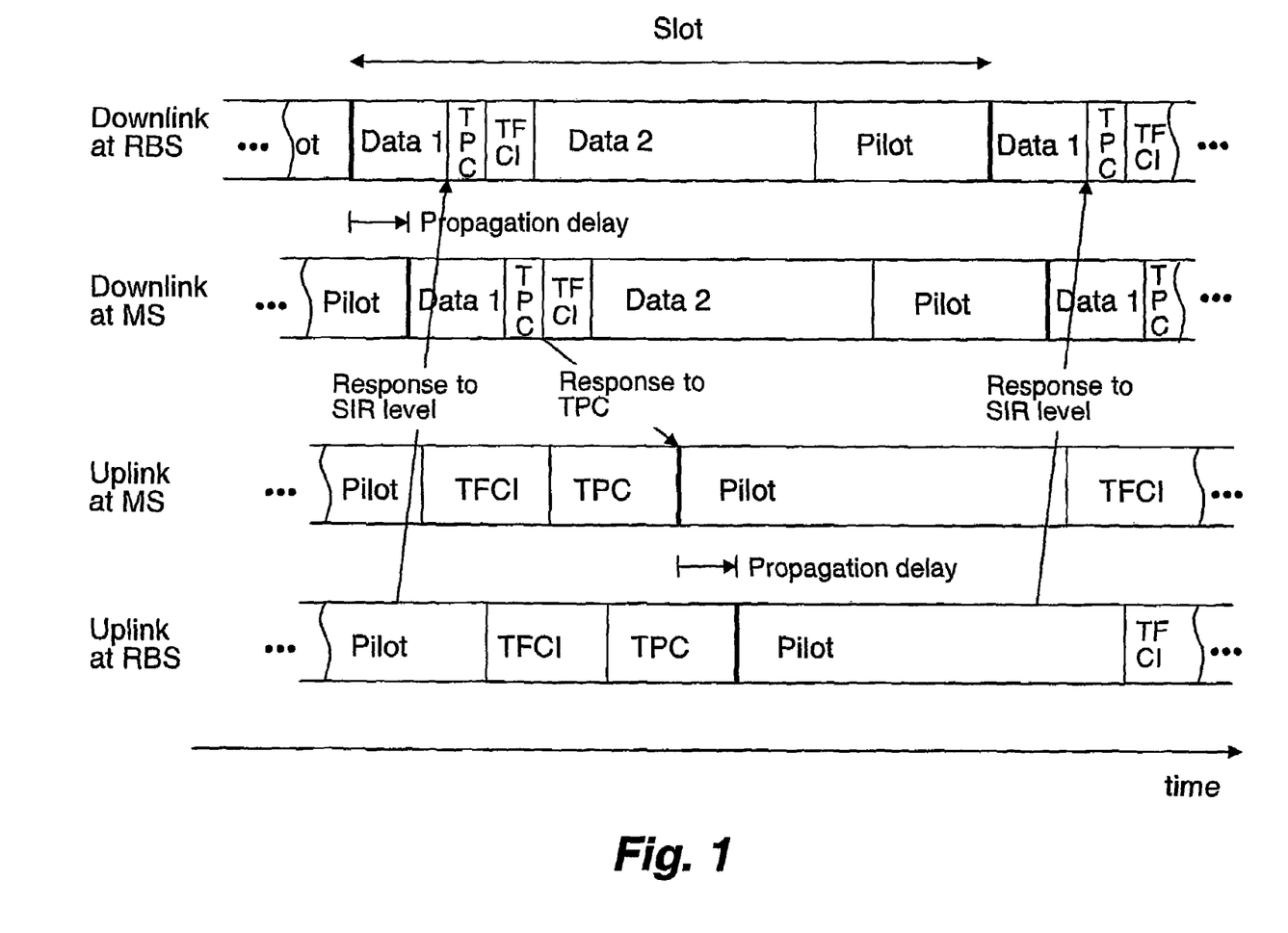
FIG. 1 displays slot content and timing, according to prior art, of transmission of TPC commands and subsequent response to TPC.

In FIG. 1, an optional, dependent on slot format and link direction, TFCI field represents a Transport Format Combination Indicator for use e.g. when several simultaneous services are included.

$3^{rd}$ Generation Partnership Project (3GPP): *Technical Specification Group Radio Access Network, Physical Layer Procedures*, 3G TS 25.214 v3.3.0, France, June 2000, specifies in annex B.1 that timing of an uplink dedicated physical channel, DPCH, is delayed by 1024 chips from the corresponding downlink DPCH to maximize cell radius within which one-slot control delay can be achieved. In the sequel this maximum radius is referred to as the one-slot distance to the base station. Basically, a TPC command comprises one bit, indicating a power increase or decrease. During soft handover there is one such basic TPC bit or TPC command for each of the links involved, to be combined into a TPC command. Consequently, the concept "TPC command" comprises both such basic and combined TPC commands. The 3GPP Technical Specification also describes out of synchronization handling. Briefly, poor quality link sets are indicated to be out of sync. Regarding uplink power control, the MS shall shut its transmitter off during downlink out-of-sync conditions. If the receive timing for any link, during soft handover, drifts to lie outside a valid range, information shall be provided, so that the network can adjust downlink timing. Regarding downlink power control, during out-of-sync periods the TPC command transmitted shall be set as "1", i.e. it shall indicate a power increase.

European Patent Application EP0955735 discloses a method, and base and mobile stations for locating transmission power control data and pilot data in relation to each other within a slot taking into account processing delays and propagation delays and slot offsetting between uplink and downlink.

None of the cited documents above discloses a closed loop transmission power control, TPC, with the location of TPC data within a slot fixed for two or more slots in relation to pilot symbols, the power control being adaptive to loop delays varying to be larger than or smaller than the duration of one slot.

BRIEF SUMMARY

If the distance between the MS and the RBS is larger than the one-slot distance, the power control loop delay is larger than the duration of one slot. If the distance is close to the one-slot distance, it is likely for the control loop delay to vary between one and two slots due to movements of the mobile station. If the loop delay is larger than one slot and a TPC command needs to be transmitted within one slot, the TPC command will be transmitted prior to estimation of channel quality has been completed.

Correspondingly, if loop delay is larger than two, three, four, etc. slots and a TPC command needs to be transmitted within two, three, four etc. slots respectively, the TPC command will be transmitted prior to estimation of channel quality has been completed. Consequently, there is a need to assign a TPC command and find a basis for the assignment.

There is a problem in assigning the TPC command such that interference level is not increased and the connection is not lost. If transmission power would have been commanded to decrease were the loop delay not larger than one slot, the interference level to other users could increase if the assigned TPC command indicates a power increase. Similarly, if transmission power would have been commanded to increase were the loop delay not larger than one slot, the connection could be lost if the assigned TPC command indicates a power decrease. The restriction of TPC commands to indicate only a transmission power increase or decrease, in accordance with the 3GPP Technical Specification, makes the assignment critical.

The TPC command assignment should take into account a transitional phase when the loop delay increases or decreases to pass a slot-border. It should also apply in a (quasi-) stationary environment with loop delays larger than one (or more) slot intervals.

It is consequently an object of the present technology to achieve transmission power control that is stable when transmission power control loop delay increases beyond a slot border.

It is also an object to achieve a system stabilized for loop delays varying so as to be larger than the duration of one slot interval in one instance and not larger than one slot interval in the next instance and vice versa.

An object is also to have a transmission power control operating at a loop delay as small as possible.

A further object of the present technology is to remedy a too high or too low transmission power level.

Finally, it is an object to achieve a stable transmission power control using fixed location relation within a slot for uplink and downlink and using a fixed timing relation between uplink and downlink.

These objects are met by a method and apparatus transmitting a TPC command based upon a latest earlier measurement, not yet made use of, if available, and if not available, transmitting a TPC command identical to a most recently transmitted TPC command at its first occurrence and transmitting a TPC command corresponding to an inversion of a most recently transmitted TPC command at later occurrences.

DESCRIPTION OF PREFERRED EMBODIMENT

In particularly a CDMA system it is important to control the uplink (and downlink) transmission power to a level not larger than necessary in order to keep the interference level and power consumption of the system at a minimum.

A candidate solution to avoid varying loop delays is to insert an adaptive delay for respective up- and downlink power control loops in the RBS or MS to operate the system at a (close to) fix loop delay equal to the largest loop delay allowed, preventing the total delay to pass a slot border, i.e. preventing it from increasing or decreasing by the duration of one slot or more. However, in most cases such a solution leads to an excessive loop delay, detrimental to system performance.

The previous TPC command is repeated if no measurement data, upon which no previous TPC command is based, is available in a first occurrence. If no measurement data is available in later occurrences, the previous TPC command is inverted. The repetition, in the first occurrence, will guarantee that the inversion process does not increase transmission power to a level higher than the power level at a point in time where the delay passed the slot border, if the previous TPC command indicated a transmission power decrease. Correspondingly, the repetition, in the first occurrence, will guarantee that the inversion process does not decrease transmission power below the power level at the time when loop delay increased beyond a slot border, if the previous TPC command indicated a transmission power increase. This property is important, for the inversion process not to be the cause of an increased interference level or a lost connection.

Typically, as received signal quality deteriorates to a lowest acceptable quality level, a transmitter is commanded to increase transmission power. If the next command is also an increase, there is no risk of loosing the connection caused by the power control commanding power to decrease. A corresponding but reversed situation occurs when transmission power is larger than necessary and increasing an overall interference level to be decreased by power control. In this reverse situation, a penalty of using an assignment not behaving well would strike other users interfered with.

Figure 2:
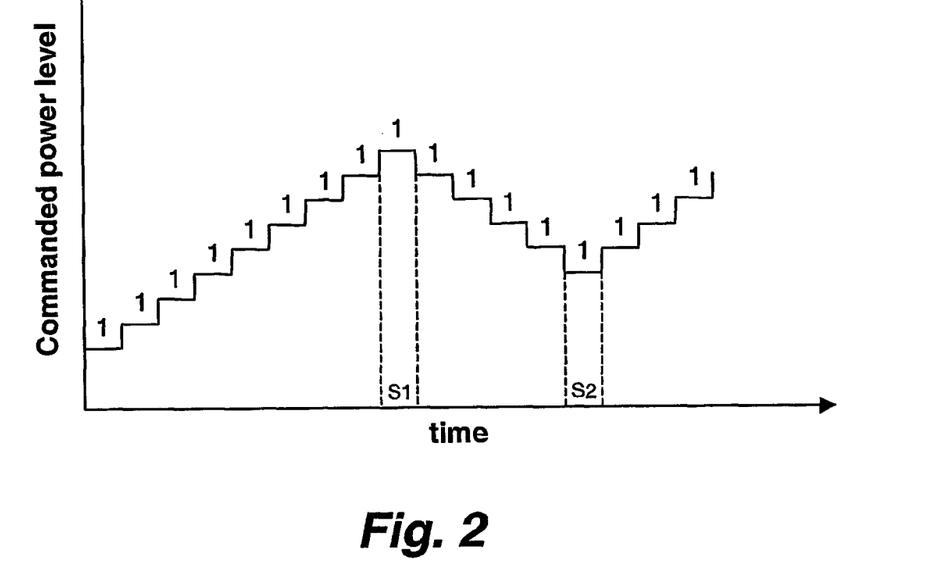
FIG. 2 illustrates an incrementally commanded power level versus time, with a loop delay not larger than one slot.
Figure 4:
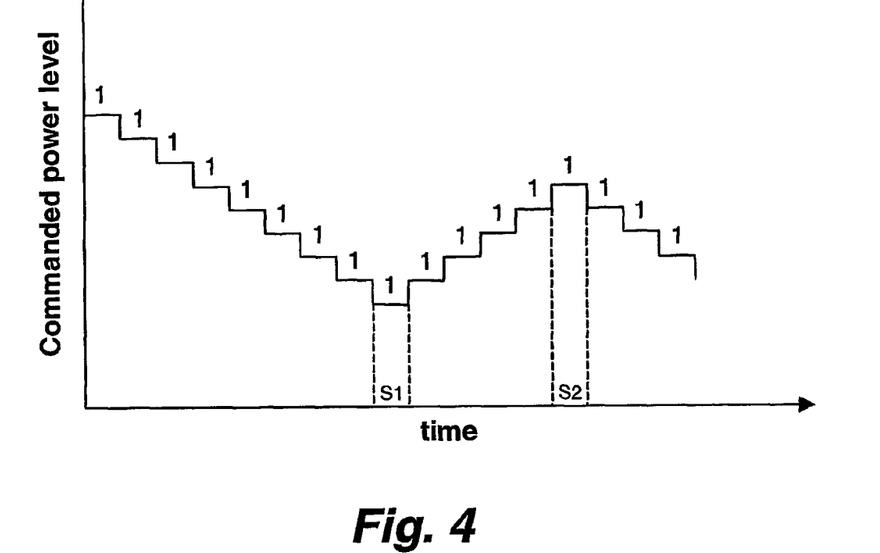
FIG. 4 illustrates another sample of commanded power level versus time, in the case of a received quality level varying in relation to a target level with a loop delay not larger than one slot.

FIGS. 2 and 4 each reveals a resulting commanded power level versus time for a particular received signal quality varying over time when power control loop delay remains within one slot. The selection of one single slot is only an example. The same principle holds for successively larger distances, i.e. varying the loop delay between two and three slots, three and four slots, etc. In FIG. 2, transmission power is commanded to increase until slot S1. According to the received signal quality, transmission power is commanded to decrease in the interval between S1 and S2. At slot S2 the commanded transmission power is again commanded to increase as a response to a decreased received signal quality. In FIG. 4 increases and decreases are interchanged in relation to FIG. 2.

Figure 3:
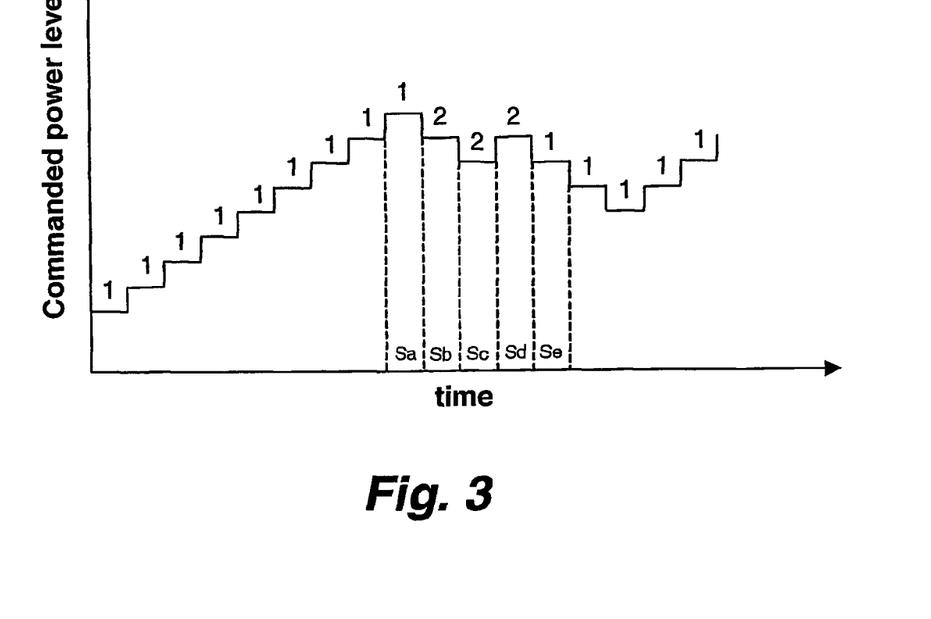
FIG. 3 illustrates an incrementally commanded power level versus time, with loop delays varying between not larger than one slot and larger than one slot but not larger than two slots, according to a preferred embodiment.
Figure 5:
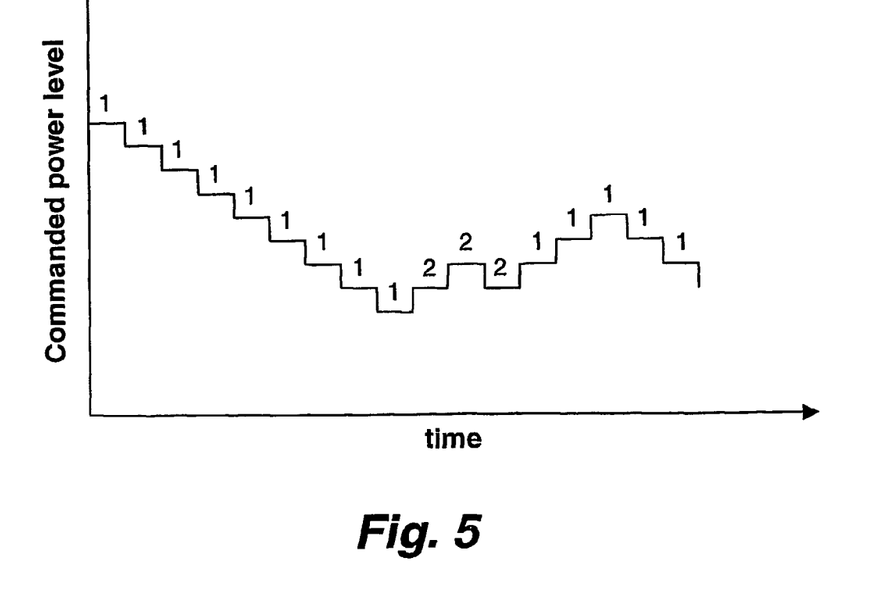
FIG. 5 illustrates an incrementally commanded power level versus time, with loop delays identical to those of FIG. 3, according to a preferred embodiment.

FIG. 3 describes a resulting commanded power level versus time for a received signal quality corresponding to that of FIG. 2. For each power level the loop delay is indicated by "1" or "2". "1" denotes a loop delay larger than zero but not larger than one slot. "2" denotes a loop delay larger than the duration of one slot but not larger than the duration of two slots. The loop delay is indicated correspondingly in FIG. 5. In FIGS. 3 and 5 no measurement data not forming a basis of a previous TPC command is available for the time slots indicated by "2".

In FIG. 3 the problem of assigning a TPC command with no measurement data available and simultaneously avoiding the risk of increasing the commanded power level is solved by repeating the immediately preceding TPC command value when the slot border is passed due to an increased power control loop delay. Consequently, if the immediately preceding TPC command is a regular TPC command transmitted with a loop delay within one slot interval as in slot Sa, this TPC command value is repeated, as illustrated in slot Sb. In the proceeding slot interval Sc, the immediately preceding TPC command in slot Sb is a repetition of a previous TPC command in slot Sa and not a TPC command assigned on the basis of <<most recent measurement data not previously forming a basis for a TPC command>>. According to the preferred embodiment, the TPC command in slot Sc is an inversion of the previously repeated TPC command in slot Sb. Since the loop delay remains larger than one slot interval when the next TPC command is scheduled for transmission in slot Sd, the transmitted TPC command will be an inversion of its immediately preceding bit. Interchanging TPC command inversions are transmitted until the loop delay is not larger than one slot interval. Then a regular TPC command is transmitted, as in slot Se.

Referring to FIG. 5, the receiver is enforced to communicate a power control command within the required number of slots (in this exemplary presentation one slot) by transmitting a TPC command with no measurement data available. Similar to FIG. 3, the problem is solved by repeating the immediately preceding TPC command when the slot border is passed due to an increased power control loop delay and interchangingly inverting the TPC command in subsequent slots until the loop delay exceeds one slot interval.

Figure 6:
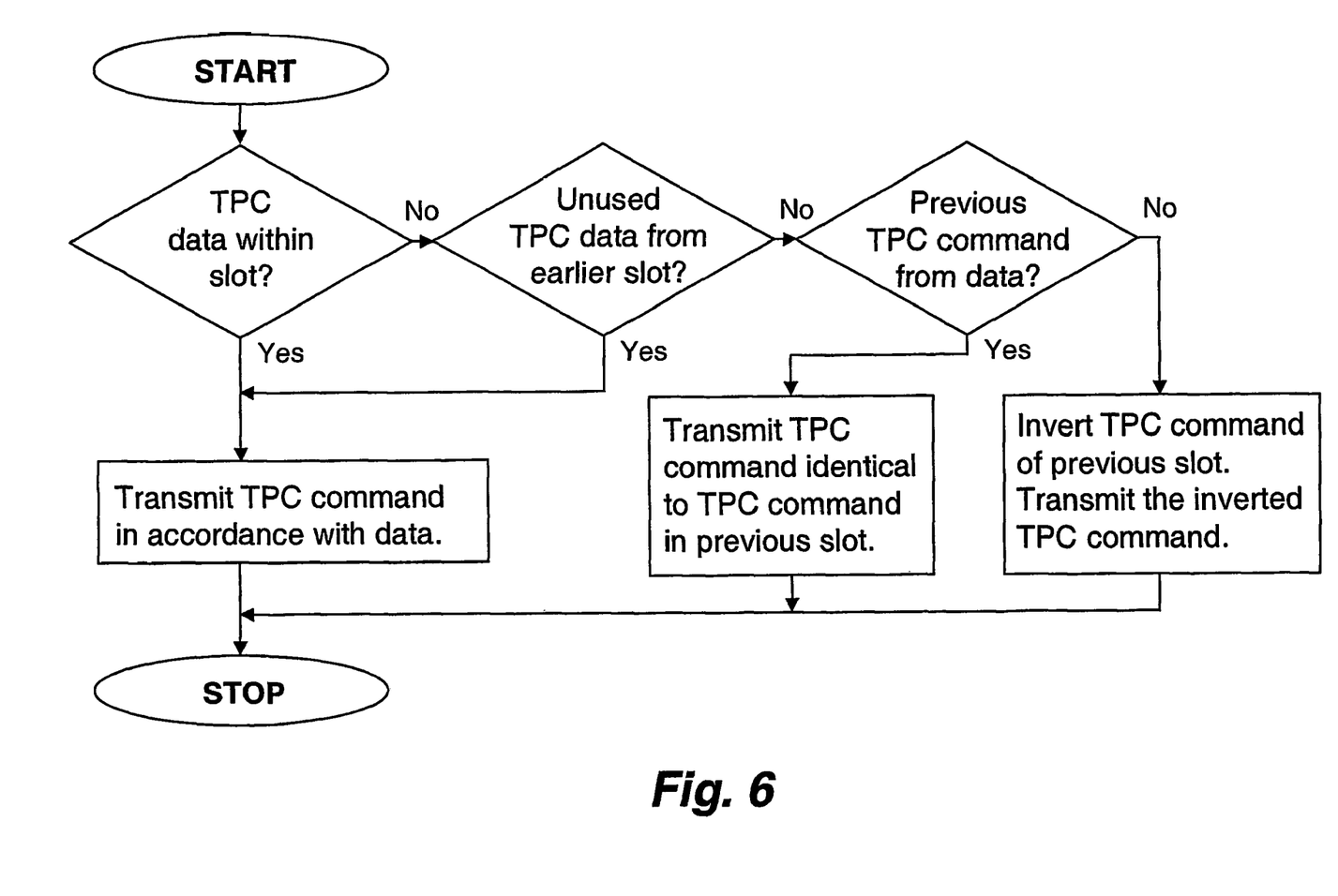
FIG. 6 shows a flowchart of a preferred embodiment.

FIG. 6 shows a flowchart of a preferred embodiment. Upon communication of a TPC command the receiver investigates whether it can respond within one slot interval. When the loop delay is determined to be within the slot interval, the receiver communicates a regular TPC command. The loop delay can be estimated by the fact that expected measurement data is not available at the time of assignment of the TPC command. If the slot border is exceeded, the TPC command to communicate depends on the previously transmitted TPC command. If the previous TPC command was a TPC command determined from <<most recent measurement data not previously forming a basis for a TPC command>>the receiver communicates this TPC command. If the previous TPC command was not such a TPC command the receiver communicates an inversion of the previous TPC command as described in relation to FIGS. 3 and 5, above. If the previous TPC command indicated a power increase, its inversion will indicate a power decrease. Correspondingly, if the TPC command indicated a power decrease, its inversion will indicate a power increase.

Figure 7:
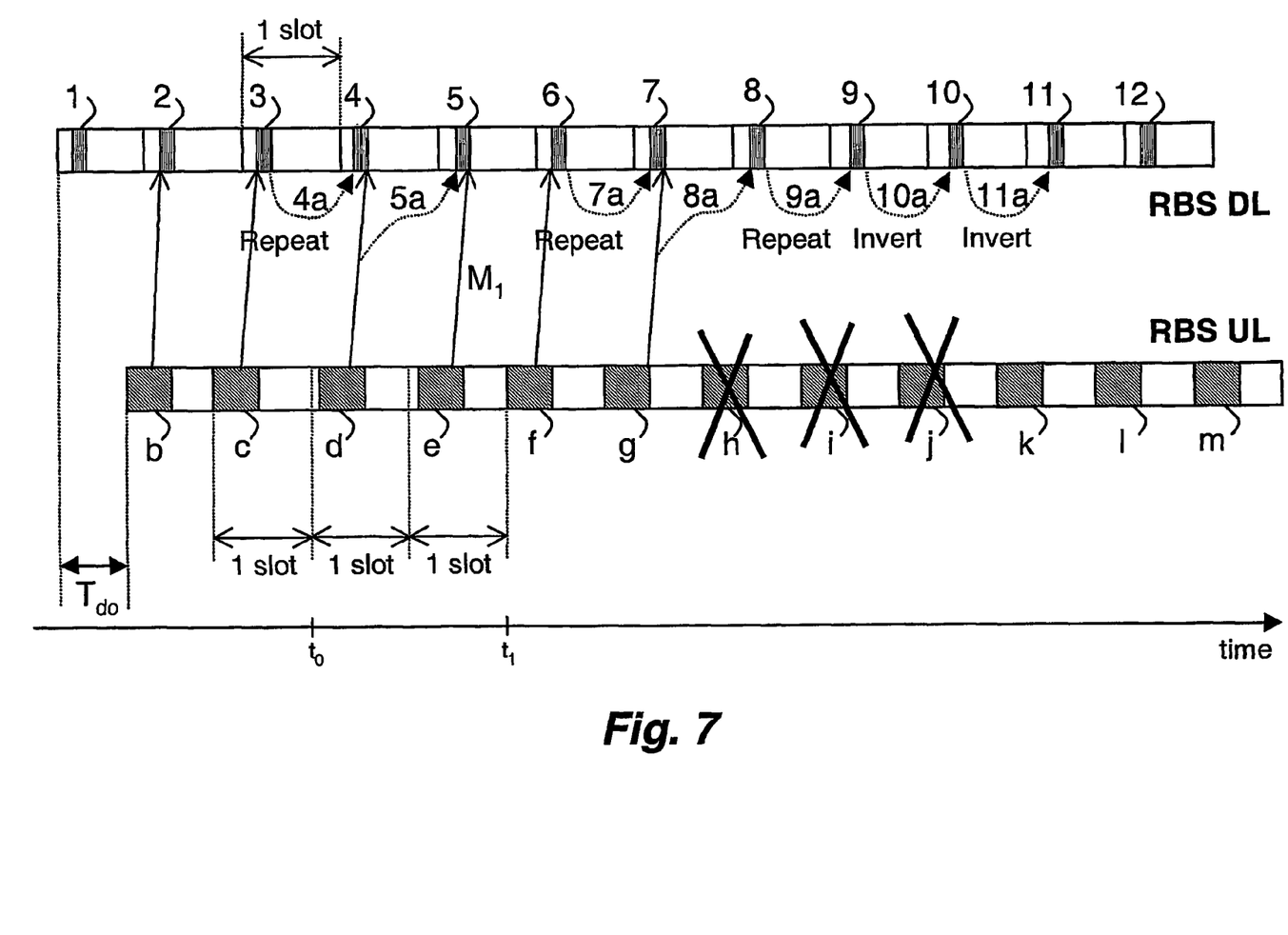
FIG. 7 displays the principle of assigning a TPC command when no measurement data of the same slot is available, according to a preferred embodiment.

FIG. 7 displays the principle of assigning a TPC command according to the flowchart in FIG. 6 in a preferred embodiment. In FIG. 7 a sample of TPC commands 1-12 for uplink power control is displayed versus time. The timing is illustrated, as it is perceived at a base station. The illustrated commands are transmitted on the downlink. However, there is no fundamental difference between downlink power control and uplink power control. Consequently, the following explanation of FIG. 7 also applies to downlink power control, interchanging the roles of RBS and MS. The uplink and downlink timing includes two components, a fix uplink-downlink timing offset and a distance dependent round trip propagation and processing delay. In the first slot illustrated in FIG. 7 this uplink-downlink timing equals $T_{do}$. In FIG. 7 this uplink-downlink timing varies due to varying propagation delays in various time slots. 1-3 are regular TPC commands. TPC command 2 is based on the uplink quality measured on a pilot sequence b. Correspondingly, TPC command 3 is based on the uplink quality measured on a pilot sequence c. The measurements on pilot sequences b and c are completed prior to transmission of TPC commands 2 and 3, respectively. In equivalent words, TPC commands 2 and 3 are both within a loop delay not larger than the duration of one slot. At time $t_0$ loop delay increases from not larger than the duration of one slot to larger than the duration of one slot. When TPC command 4 needs to be transmitted there is no measurement available from the corresponding pilot sequence d since the loop delay is larger than the duration of one slot. Further, the measurement from pilot sequence c, the most recent earlier slot, has already been used as a basis for forming TPC command 3. As the previous TPC command 3 was based on measurement data, TPC command 4 is assigned a value identical to the previous TPC command 3, i.e. TPC command 3 is repeated. As TPC command 5 needs to be transmitted, there is again no measurement data available within a loop delay of one slot, i.e. from the corresponding pilot sequence e. However, there is measurement data on pilot symbols from the previous slot d, this measurement data has not been made use of and there is no later available measurement data that has not been made use of. This measurement data forms the basis for TPC command 5. At time $t_1$ loop delay reduces and is not larger than the duration of one slot when TPC command 6 needs to be determined. Measurement data from the pilot sequence f of the corresponding slot is available at the time TPC command 6 is assigned. In the sequel measurement data M from pilot sequence e will never again be a most recent earlier measurement data not used as a basis for assignment of a TPC command, within the meaning of this patent application, as measurement data on f is more recent. Consequently, when TPC command 7 needs to be assigned there is no measurement data on the pilot sequence g of the corresponding slot available, and there is no <<most recent measurement data not previously forming a basis for a TPC command>>. As the previous TPC command 6 was based on measurement data (from f), TPC command 7 is assigned a value identical to TPC command 6. TPC command 8 is formed on basis of the measurement data from pilot sequence g not previously made use of. As TPC commands 9, 10 and 11 needs to be assigned there is no <<most recent measurement data not previously forming a basis for a TPC command>> available for the assignment. TPC command 8 is not achieved from unused measurement data but from repeating TPC command 7. Consequently, TPC commands 9, 10 and 11 are assigned the inversion of TPC commands 8, 9 and 10 respectively. This invention is not limited to any particular reason, for which no measurement data is available during intervals h, i and j. One reason could be that MS has shut off its transmission power, another reason could be that uplink is out-of-sync due to poor receiver or link conditions (cf. FIG. 8).

Figure 8:
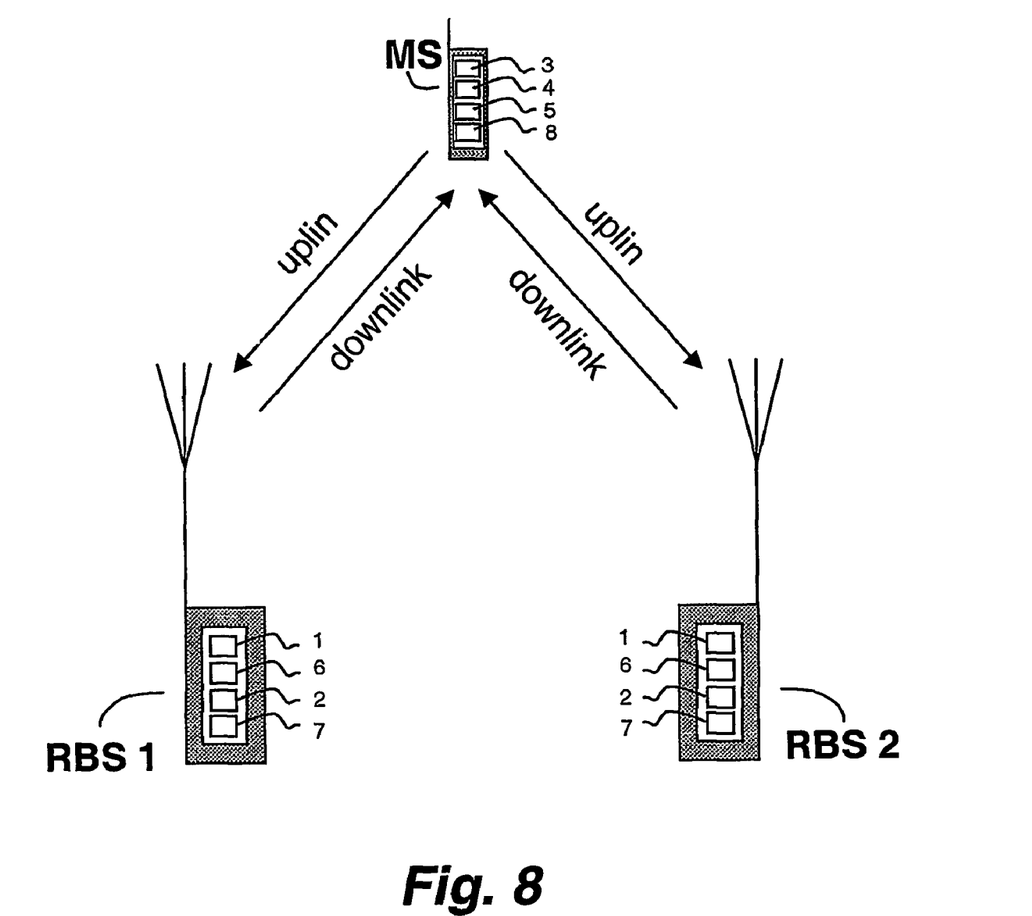
FIG. 8 schematically illustrates a mobile station and two radio base stations.

FIG. 8 schematically illustrates a subsystem including an MS and two RBSs. The system instruments the embodiments described above. In this figure the RBSs are indicated to operate omnidirectionally. However, the invention is not limited to omnidirectional radio base stations. It can readily be used irrespective of whether the RBSs use directional or omnidirectional antenna radiation patterns. A first radio base station RBS 1 is provided, according to the preferred embodiment, with means 1 for detection of link quality and means 2 for transmission of a first, second or third power control command. RBS 1 and RBS 2 are equipped with logic as needed to decide on which power control command to transmit. Means 1 and 2 can be included in the RBS or connected as one or more separate devices. The MS is furnished with means 3 for identifying and responding to received power control commands. The radio base station RBS 1 or RBS 2 receives signals on an uplink. The received signal quality and loop delay forming a basis of the TPC command. The TPC command is transmitted on the downlink for transmission power control of the MS, so called uplink power control. If the invention is also applied for downlink power control, transmission power of the RBS is controlled correspondingly reversing the roles of the RBS and MS. For this situation the MS is illustrated including means 4 and 5 corresponding to means 1 and 2 respectively of the RBS and the RBS is furnished with means 6 corresponding to means 3 of the MS. RBS 1 and RBS 2 include storage means 7 for storage of measurement data. The MS includes corresponding storage means 8.

A person skilled in the art readily understands that the receiver and transmitter properties of an RBS or an MS are general in nature. The use of concepts such as RBS or MS within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs.

The invention is not intended to be limited only to the embodiments described in detail above. Changes and modifications may be made without departing from the invention. It covers all modifications within the scope of the following claims.

The invention claimed is:

1. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein measurement data not yet forming a basis of a power control command is stored until new measurement data is collected or the measurement data is used for forming a basis of a power control command.

2. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein the second power control command is communicated when the immediately preceding power control command was a first power control command.

3. The method according to claim 2 characterized in that the first power control command is determined on the basis of measurement data received most recently and prior to the specified point in time; the measurement data received not previously serving as a basis of determining a power control command.

4. The method according to claim 2 characterized in that the receiver is a radio base station, or is included in or connected to a radio base station.

5. The method according to claim 2 characterized in that the receiver is a mobile station, or is included in or connected to a mobile station.

6. A radio communication system comprising means for carrying out the method of claim 2.

7. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein the third power control command is communicated when the immediately preceding power control command was a second or a third power control command.

8. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein the second power control command is identical to the immediately preceding power control command.

9. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein the third power control command is identical to the immediately preceding power control command inverted.

10. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein the specified point in time is equal to or related to the point in time of assignment of a TPC command.

11. A method of communicating power control commands from a receiver to a transmitter wherein a first power control command is communicated when there is most recent measurement data not previously forming a basis for a power control command available at a specified point in time, and a second or third power control command is communicated when no most recent measurement data not previously forming a basis for a power control command is available at the specified point in time, and wherein the specified point in time corresponds to a largest loop delay equal to the duration of an integer multiple of the duration of one slot interval, the integer multiple being at least one.

12. A receiver element including means for communication of power control commands to a transmitter, the receiver element comprising:
means for determining when there is available most recent measurement data;
means for communication of a first power control command when the most recent measurement data is available and for communication of a second or third power control command when no most recent measurement data is available, the third power control command being identical to an immediately preceding power control command inverted;
means for communication of the second power control command when the immediately preceding power control command was a first power control command.

13. A receiver element including means for communication of power control commands to a transmitter, the receiver element comprising:
means for determining when there is available most recent measurement data;
means for communication of a first power control command when the most recent measurement data is available and for communication of a second or third power control command when no most recent measurement data is available, the third power control command being identical to an immediately preceding power control command inverted;

means for communication of the third power control command when the immediately preceding power control command was a second or a third power control command.

14. The receiver element according to claim 13, characterized by means for determining the first power control command on the basis of the measurement data received most recently.

15. The receiver element according to claim 13 characterized in that the receiver is a radio base station, or is included in or connected to a radio base station.

16. The receiver element according to claim 13 characterized in that the receiver is a mobile station, or is included in or connected to a mobile station.

17. A receiver element including means for communication of power control commands to a transmitter, the receiver element comprising:
   means for determining when there is available most recent measurement data;
   means for communication of a first power control command when the most recent measurement data is available and for communication of a second or third power control command when no most recent measurement data is available, the third power control command being identical to an immediately preceding power control command inverted;
   wherein the second power control command is identical to the immediately preceding power control command.

18. A receiver element including means for communication of power control commands to a transmitter, the receiver element comprising:
   means for determining when there is available most recent measurement data;
   means for communication of a first power control command when the most recent measurement data is available and for communication of a second or third power control command when no most recent measurement data is available, the third power control command being identical to an immediately preceding power control command inverted;
   wherein the third power control command is identical to the immediately preceding power control command inverted.

19. A receiver comprising:
   a loop delay detector configured to determine when a loop delay between the receiver and a transmitter is within a transmission slot interval;
   a power control command generator configured to generate a power control command for transmission to the transmitter, and wherein the power control command as generated by the power control command generator is either:
   (1) dependent upon a measurement made within the transmission slot interval when the loop delay is within the transmission slot interval;
   (2) a repetition of a most recently transmitted power control command when the loop delay is not within the transmission slot interval and the most recently transmitted power control command was based on measurement not previously forming a basis for a power control command;
   (3) dependent upon measurement data which has been not utilized for a power control command when the loop delay is not within the transmission slot interval;
   (4) an inversion of the most recently transmitted power control command when the loop delay is not within the transmission slot interval and the most recent measurement data previously formed a basis for a power control command.

20. The apparatus of claim 19, wherein the receiver comprises a radio base station.

21. The apparatus of claim 19, wherein the receiver comprises a wireless terminal.

22. A receiver element comprising:
   means for communication of power control commands to a transmitter;
   means for determining when most recent measurement data is available;
   means for communication of a first power control command when the most recent measurement data is available and, when no most recent measurement data is available, for making a selection between a second power value or a third power value, the selection depending on how long measurement data has been unavailable;
   means for storage of measurement data not yet forming a basis of a power control command.

23. A receiver element comprising:
   means for communication of power control commands to a transmitter;
   means for determining when most recent measurement data is available;
   means for communication of a first power control command when the most recent measurement data is available and, when no most recent measurement data is available, for making a selection between a second power value or a third power value, the selection depending on how long measurement data has been unavailable;
   wherein the second power value is a repeat of a previous power value and the third power value is an inversion of the previous power value.

* * * * *